US010121220B2

(12) United States Patent
Bolz (10) Patent No.: US 10,121,220 B2
(45) Date of Patent: Nov. 6, 2018

(54) SYSTEM AND METHOD FOR CREATING ALIASED MAPPINGS TO MINIMIZE IMPACT OF CACHE INVALIDATION (71) Applicant: Nvidia Corporation, Santa Clara, CA (US)

(72) Inventor: Jeffrey Bolz, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 5 days.

(21) Appl. No.: 14/698,024

(22) Filed: Apr. 28, 2015

(65) Prior Publication Data

US 2016/0321773 A1 Nov. 3, 2016

(51) Int. Cl.
G06T 1/20 (2006.01)
G06F 12/0831 (2016.01)
G06T 1/60 (2006.01)
G09G 5/395 (2006.01)
G06F 9/38 (2018.01)
G06T 15/04 (2011.01)
G06T 15/00 (2011.01)

(52) U.S. Cl.
CPC ............. G06T 1/20 (2013.01); G06F 9/3885 (2013.01); G06F 12/0833 (2013.01); G06T 15/005 (2013.01); G06T 15/04 (2013.01); G09G 5/395 (2013.01); G06F 2212/621 (2013.01)

(58) Field of Classification Search
None
See application file for complete search history.

(56) References Cited

U.S. PATENT DOCUMENTS

| 6,744,438 B1 * | 6/2004 | Baldwin | G06T 11/40 345/531 |
| 2003/0063087 A1* | 4/2003 | Doyle | G06T 15/405 345/422 |
| 2011/0072213 A1* | 3/2011 | Nickolls | G06F 12/0862 711/122 |
| 2013/0185520 A1* | 7/2013 | Dieffenderfer | G06F 12/1063 711/144 |
| 2014/0258623 A1* | 9/2014 | Meredith | G06F 12/0804 711/122 |
| 2015/0256484 A1* | 9/2015 | Cameron | G06F 9/3004 709/226 |

OTHER PUBLICATIONS

Nvidia, "CUDA C programming guide", May 6, 2011, Nvidia.*

* cited by examiner

Primary Examiner — Mark Zimmerman
Assistant Examiner — Yu-Jang Tswei (57) ABSTRACT A parallel processor and a method of reducing texture cache invalidation are disclosed. In one embodiment, the parallel processor includes a cache configured to receive lines of data; and a parallel execution unit associated with the cache and configured to execute parallel counterparts of an operation. The parallel counterparts, when executed, are configured to create, in the cache, corresponding aliases of a line of data pertaining to the operation such that the parallel counterparts are operable to invalidate only the corresponding aliases.

20 Claims, 5 Drawing Sheets

SYSTEM AND METHOD FOR CREATING ALIASED MAPPINGS TO MINIMIZE IMPACT OF CACHE INVALIDATION

TECHNICAL FIELD

This application is directed, in general, to graphics processing and, more specifically, to cache management techniques related to texture caches of graphics processing units (CPUs).

BACKGROUND

A modern GPU includes texture processing hardware configured to perform a variety of texture-related (including surface-related) operations, including texture load operations, texture store operations and texture cache operations. The texture processing hardware accesses surface texture information from the texture cache under varying circumstances, such as while rendering object surfaces in a three-dimensional (3D) graphics scene for display on a display device, while rendering a two-dimensional (2D) graphics scene, or during compute operations. Surface texture information includes texture elements (texels) used to texture or shade object surfaces in a 3D graphics scene. Typically, the texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

SUMMARY

One aspect provides a parallel processor. In one embodiment, the parallel processor includes: (1) a cache configured to receive lines of data and (2) a parallel execution unit associated with the cache and configured to execute parallel counterparts of an operation. The parallel counterparts, when executed, are configured to create, in the cache, corresponding aliases of a line of data pertaining to the operation such that the parallel counterparts are operable to invalidate only the corresponding aliases.

Another aspect provides a method of reducing texture cache invalidation. In one embodiment, the method includes: (1) executing parallel counterparts of a surface operation that is to operate on a line of data, (2) causing, with the parallel counterparts, corresponding aliases of the line of data to be loaded into a cache and (3) allowing the parallel counterparts of the operation to invalidate only the corresponding aliases.

Yet another aspect provides a surface operation in a library of graphics operations. The surface operation includes: (1) executing parallel counterparts of the surface operation that is to operate on a line of data, (2) causing, with the parallel counterparts, corresponding aliases of the line of data to be loaded into a cache and (3) allowing the parallel counterparts of the operation to invalidate only the corresponding aliases.

BRIEF DESCRIPTION

Reference is now made to the following descriptions taken in conjunction with the accompanying drawings, in which.

DETAILED DESCRIPTION

Surface and texture operations are used to access data in a texture cache. While these operations are used to access the same texture cache, they are used in slightly different ways as they offer different functionalities. For example, while texture operations offer optimized read-only operations and support filtering, surface operations offer both read and write operations and do not support filtering. It is realized herein that using surface and texture operations together, especially the optimized texture load/read operation and the surface store/write operation, would be beneficial in accessing a texture cache.

However, as texture and surface operations are often implemented using separate hardware, they exhibit different caching behaviors that make using both operations together difficult. More specifically, to use a texture load/read operation and a surface store/write operation together, an explicit invalidation is required between the operations because the operations are not coherent with each other.

It is realized herein that conventional invalidation scheme is excessive and wasteful in terms of accessing cached data. For example, an operation using a block of cached data, e.g., a line of a cache, is being executed. When any one of many parallel counterparts of such an operation issues an invalidation, the invalidation invalidates all the cached data in the block because the invalidation is carried out with respect to a header that singlehandedly represents the entire block of data.

Introduced herein are various embodiments of a parallel processor and a method that reduce the impact of invalidation. Instead of using a single header to represent a block of data pertaining to an operation, multiple aliases of the header are employed to represent that block of data. As such, when these aliases are assigned to multiple corresponding counterparts of an operation using the block of data, each counterpart thinks that it is using its own block of data. But in reality, they are just using different copies of the same block of data. Accordingly, when one of the parallel counterparts issues an invalidation, the invalidation is carried out with respective alias and only a copy of the block of data associated with that alias is invalidated; no other parallel counterparts are affected. Accordingly, the impact of invalidation is significantly reduced compared to the conventional scheme.

In the following description, numerous specific details are set forth to provide a more thorough understanding of the present invention. However, it will be apparent to one of skill in the art that the present invention may be practiced without one or more of these specific details.

System Overview

Figure 1:
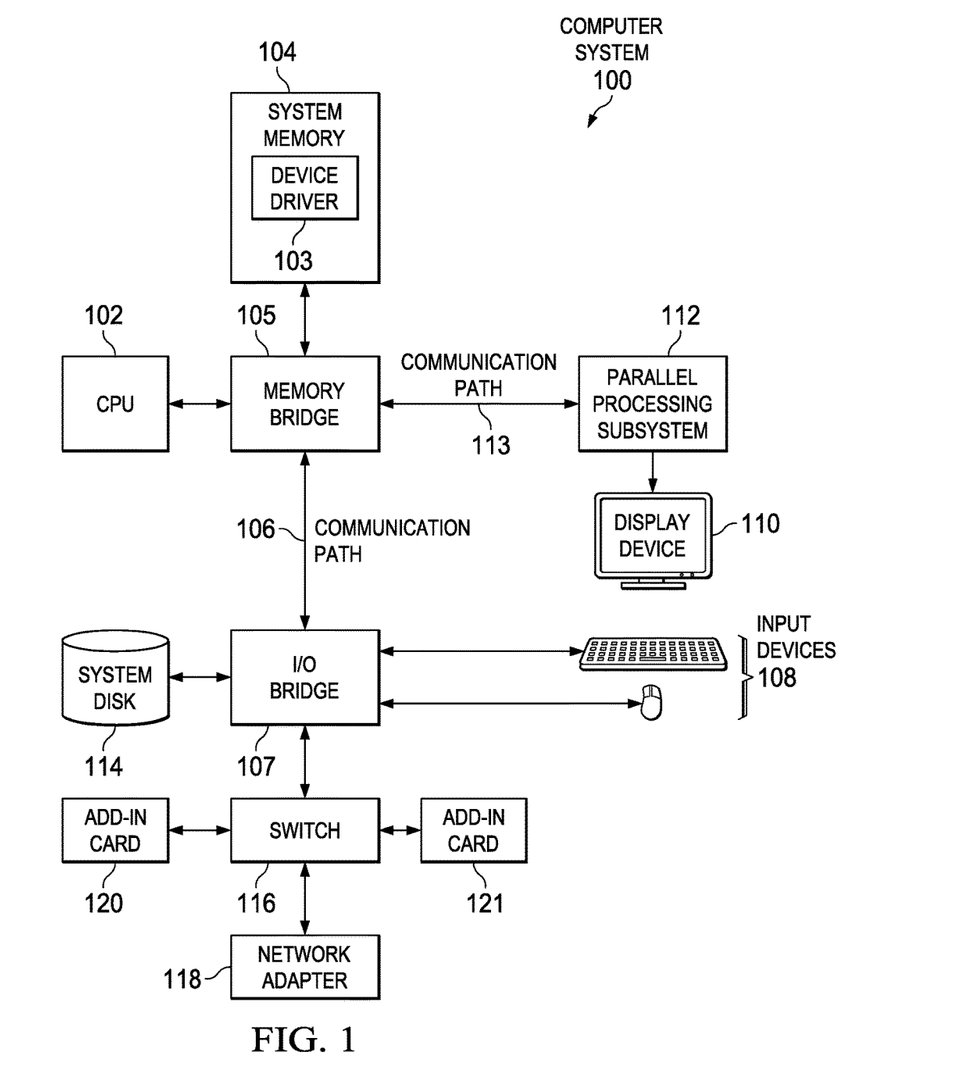
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an 110 (input/output) bridge 107 via a communication path 106, and 110 bridge 107 is, in turn, coupled to a switch 116.

In operation, 110 bridge 107 is configured to receive user input information from input devices 108, such as a keyboard or a mouse, and forward the input information to CPU 102 for processing via communication path 106 and memory bridge 105. Switch 116 is configured to provide connections between 110 bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
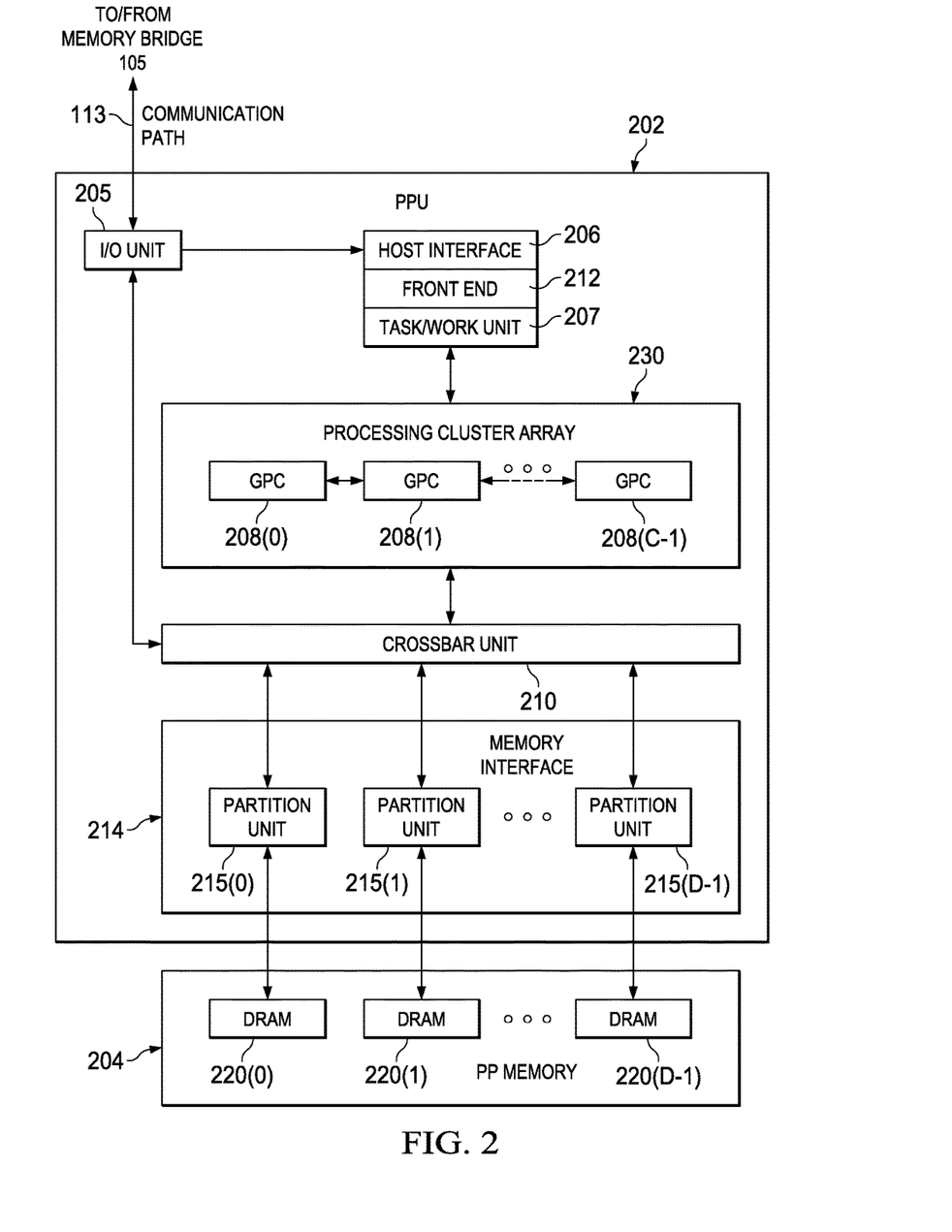
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each push buffer by an application program via device driver 103 to control scheduling of the different pushbuffers.

As also shown, PPU 202 includes an I/D (input/output) unit 205 that communicates with the rest of computer system 100 via the communication path 113 and memory bridge 105. I/D unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with 110 unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
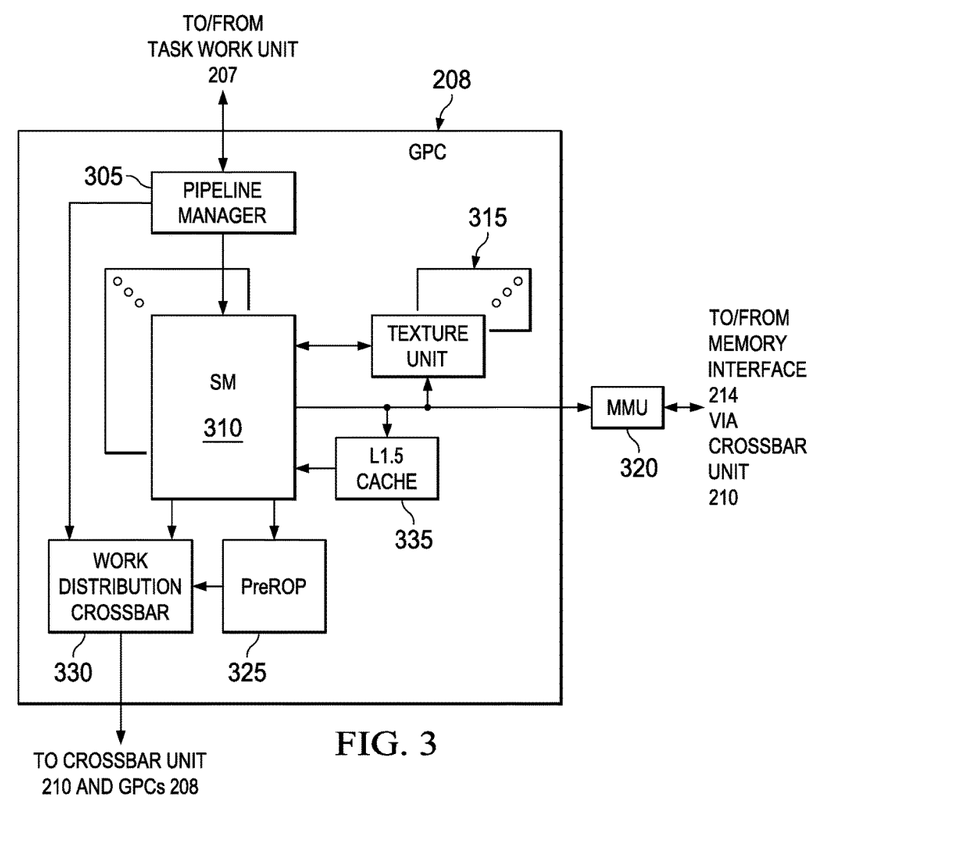
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Please note, as used herein, references to shared memory may include anyone or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Load/Store Operations in Texture Processing Hardware

Figure 4:
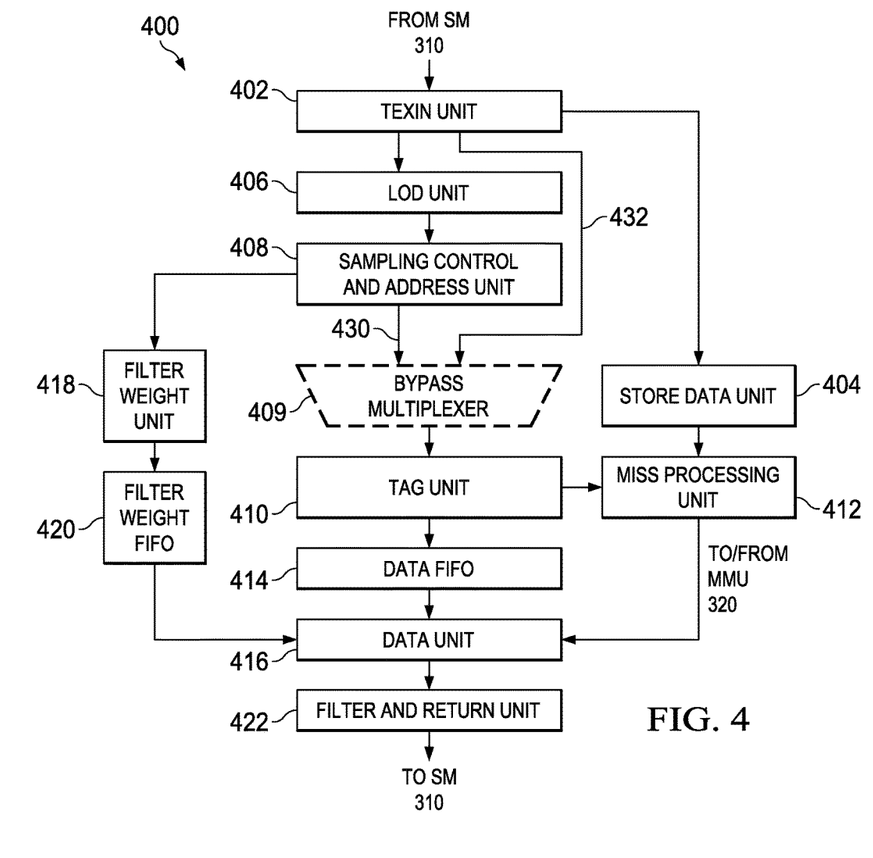
FIG. 4 is a conceptual diagram of a texture processing pipeline that a texture unit within the general processing cluster of FIG. 3 can be configured to implement, according to one embodiment of the present invention.

FIG. 4 is a conceptual diagram of a texture processing pipeline 400 that a texture unit 315 within the general processing cluster 208 of FIG. 3 can be configured to implement, according to one embodiment of the present invention. As shown, the texture processing pipeline 400 includes a texture input (TEXIN) unit 402, a store data unit 404, a level of detail (LOD) unit 406, a sampling control and address unit 408, a bypass multiplexer 409, a tag unit 410, a miss processing unit 412, a data first-in first-out memory (FIFO) 414, a data unit 416, a filter weight unit 418, a filter weight FIFO 420, and a filter and return unit 422.

The TEXIN unit 402 is configured to process memory access requests, or operations, received from the SM 310 shown in FIG. 3. For example, a given memory access request could represent a texture data access operation, such as, a read operation that reads a texture from memory. Alternatively, a given memory access request could represent a generic data access operation, such as a local or global memory load or store operation.

The TEXIN unit 402 determines whether a given memory access request represents a texture memory access operation or a non-texture memory access operation. As further described herein, a non-texture memory access operation may be directed to any technically feasible address space that is not a texture address space, including, without limitation, generic, global, local, and surface address spaces. In one example, the TEXIN unit 402 could extract a bitfield in the received memory access request that indicates whether the memory access request represents a texture memory access operation or a non-texture memory access operation. If the TEXIN unit 402 determines that a given memory access request represents a non-texture memory access operation, then the TEXIN unit 402 configures the texture processing pipeline 400 to perform a non-texture data access operation. The TEXIN unit 402 routes the memory access request to the LOD unit 406. If the non-texture data access operation is a memory store operation, then the TEXIN unit 402 routes the data portion of the memory store operation to the store data unit 404.

The TEXIN unit 402 includes a command and data conditioning unit (not shown) that reroutes global, local, or surface store data to bypass the main processing path in the texture processing pipeline 400. The command and data conditioning unit also performs various checks to determine whether incoming the texture and non-texture load/store operations are legal. For example, certain memory access operations related to textures and surfaces could be associated with a texture header, where a texture header stores information describing characteristics of the given texture surface, including, without limitation, the type, format, dimensions, storage structure, and base address of the memory allocated to the texture or surface. If the incoming memory access operation is associated with a texture header, then the command and data conditioning unit determines whether the received memory access operation is consistent with the associated texture header, according to the type of memory access operation. If the received memory access operation is inconsistent with the texture header, then the command and data conditioning unit corrects such inconsistencies. In some embodiments, other units within the texture processing pipeline 400 may also include command and data conditioning logic.

For example, if the TEXIN unit 402 receives a store operation directed to a surface, then the command and data conditioning unit would compare the color components received with the store operation versus the color components present in the target surface, as indicated in the corresponding texture header. If the received store operation includes extra components that are not needed by the target format, then the command and data conditioning unit would discard such extra components before transmitting the operation for further processing. If certain components specified in the texture header are not received with the store operation, then the command and data conditioning unit would fill the storage area for the missing components with zero before transmitting the operation for further processing. Such an approach enables run-time linking of shader programs to surfaces even if the characteristics of the corresponding surfaces are unknown at compile time. Memory access operations are consistently presented to the texture processing pipeline 400, even if the received memory operations are inconsistent with the corresponding surface configurations.

In situations where the TEXIN unit 402 determines that the memory access request represents a texture data access operation, the TEXIN unit 402 configures the texture processing pipeline 400 to perform a texture data access operation and routes the memory access request to the LOD unit 406. When processing memory access requests that represent texture data access operations, the TEXIN unit 402 extracts additional texture information from the texture header, as further described herein, that corresponds to the texture data to be accessed from memory. The additional texture information may include any number of fields including, without limitation, texel size, texture surface base address, texture dimensions, and texture border data, among other types of texture-related information. The TEXIN unit 402 may incorporate this additional texture information into the memory access request and may then pass the memory access request to LOD unit 406.

The store data unit 404 receives data associated with non-texture data store operations and formats the data for storage in memory. The store data unit 404 provides a store data path from the texture processing pipeline 400 to main memory. The store data unit 404 enables store operations directed to various address spaces, including, without limitation, generic, global, local, and surface memory. The store data unit 404 transmits the formatted store data to the miss processing unit 412.

The LOD unit 406 is configured to compute a "level of detail" for the texture data to be accessed from memory based on the position and orientation of a set of coordinates included within the memory access request. The set of coordinates may represent the position and orientation of a texture residing within a graphics scene. LOD unit 406 may incorporate the computed level of detail into the memory access request and then pass the memory access request to the sampling control and address unit 408.

The sampling control and address unit 408 is configured to perform various address computations based on the coordinates within the memory access request. The results of the address computations may be used to identify an entry in a tag table included within tag unit 410. The sampling control and address unit 408 also provides information on how texture and surface information are sampled for certain memory access requests. The sampling control and address unit 408 may also support other functions, such as clamping, wrapping, and border color substitution behaviors for memory access requests that extend beyond the boundaries of a given texture or surface or that straddle the boundary between two textures or surfaces. The sampling control and address unit 408 passes the memory access request, address computation results, and sampling control information to the tag unit 410 and the filter weight unit 418.

In some embodiments, the bypass multiplexer 409 provides a route around the LOD unit 406 and the sampling control and address unit 408 for operations that do not need these two units for performing a particular operation. The bypass multiplexer 409 is represented using dashed lines, because the bypass multiplexer mayor may not be present as shown, or may appear as an internal bypass mechanism in anyone or more of the functional units in the texture processing pipeline. For example, a texture operation could use the LOD unit 406 and the sampling control and address unit 408 to access a level of detail within the texture cache. Accordingly, the bypass multiplexer 409 would be configured to select input 430 to route the output of the sampling control and address unit 408 to the tag unit 410. In another example, a load operation could be completed without using the functions of the LOD unit 406 and the sampling control and address unit 408. The bypass multiplexer 409 would be configured to select input 432 to route the output of the TEXIN unit 402 to the tag unit 410. In various embodiments, the bypass multiplexer 409 may bypass more or fewer units than shown in FIG. 4. In other embodiments, one or more of the units in FIG. 4 may have an internal bypass mechanism, as further described herein.

The tag unit 410 includes a tag table that stores identifying information for each cache line. For example, the identifying information could include, without limitation, the texture header index and location coordinates for each cache line. Each tag entry in the tag unit 410 represents a cache line within the data unit 416. The data unit 416 may represent a cache memory residing within the tag unit 315, or may represent any technically feasible cache memory associated with the SM 310. Upon receiving the memory access request and address computation results from the sampling control and address unit 408, the tag unit 410 determines whether the tag table includes an entry with corresponding identifying information corresponding to the texture or surface data to be retrieved.

When the tag table includes an entry corresponding to the texture or surface data to be accessed, a cache hit occurs, and the tag unit 410 determines that texture or surface data to be accessed resides in the data unit 416. In the event of a tag hit, the tag unit 410 retrieves the corresponding index into the data store. In the event of a tag miss, the tag unit 410 allocates a new data store index, and forwards the search key for the tag lookup, along with the new data store index, to the processing unit 412.

The miss processing unit 412 may access the requested texture data by computing a virtual address based on data included within the memory access request, performing a virtual to physical address translation, and then reading the requested data from a physical location. In one embodiment, the miss processing unit 512 may reside within MMU 320 shown in FIG. 3. The miss processing unit 412 may then populate the data unit 416 with the texture data or surface accessed from global or local memory and update the tag table within tag unit 410 to reflect the newly-cached texture or surface data. The texture data may then be provided to SM 310. The miss processing unit 412 connects to the MMU 320, or, more generically, to the memory subsystem.

The miss processing unit 412 may also store data received from the store data unit 404 in global or local memory. The miss processing unit 412 may compute a virtual address based on data included within the memory access request, performing a virtual to physical address translation, and then store the corresponding data into a physical location in global or local memory. The miss processing unit 412 may retrieve the stored data from global or local memory. The miss processing unit 412 may then populate the data unit 416 with the texture data or surface accessed from global or local memory and update the tag table within tag unit 410 to reflect the newly-cached texture or surface data. The texture or surface data may then be provided to SM 310 for subsequent load operations associated with the retrieved data.

The data FIFO 414 delays the information from the tag unit 410 to match the delay through the miss processing unit 412, the filter weight unit 418, and the filter weight FIFO 420. As a result, the data from the tag unit 410 and corresponding data from the filter weight unit 418 arrive at the data unit 416 at the same time. Accordingly, the data FIFO 414 introduces latency to facilitate in-order processing of the memory access requests that are passing through the texture processing pipeline 400. In various embodiments, functional units other than the data FIFO 414 may be used to provide for more complex ordering of memory access requests passing through the texture processing pipeline 400.

In some embodiments, a MIPmap address unit (not shown) may receive coordinate-based addresses from the sampling control and address unit 408 and may assist with calculating the virtual address. The MIPmap address unit may transmit virtual address information to the miss processing unit 412.

The filter weight unit 418 determines filtering weights and depth comparison values corresponding to an incoming memory access request based on data received from the sampling control and address unit 408.

If the sampling control and address unit 408 determines that filtering control is needed to complete a given memory access request, then the path through the filter weight unit 418 and filter weight FIFO 220 is taken in addition to the main path through the tag unit 410, the data FIFO 414, and the data unit 416. For general and surface load operations, the memory access request directly specifies the target texture elements, and no filtering is needed. In these cases, the filter weight unit 418 and filter weight FIFO 420 are not used and may be bypassed. The filter weight unit 418 passes the filtering weights and depth comparison values to the filter weight FIFO 420.

When a memory access request uses filter weights, the filter weight FIFO 420 delays the information from the filter weight unit 418 to match the delay through the miss processing unit 412, the tag unit 410, the data FIFO 414, and other associated stages of the texture processing pipeline 400. As a result, the data from the filter weight unit 418 and corresponding data from the tag unit 410 arrive at the data unit 416 at the same time. Accordingly, the filter weight FIFO 420 introduces latency to facilitate in-order processing of the memory access requests that are passing through the texture processing pipeline 400. In various embodiments, functional units other than the filter weight FIFO 420 may be used to provide for more complex ordering of memory access requests passing through the texture processing pipeline 400.

The data unit 416 receives memory addresses for one or more texture samples from the data FIFO 414 and the filter weight FIFO 420. The data unit 416 also receives corresponding filter weight values, if any, from the filter weight FIFO 420. The data unit 416 retrieves the data associated with the one or more texture samples from cache memory. The data unit 416 passes the retrieved data and associated filter weight information to the filter and return unit 422.

The filter and return unit 422 receives data and associated filter weight values from the data unit 416. The filter and return unit 422 applies one or more filters to the received data, including, without limitation, isotropic filters and anisotropic filters. The filter and return unit 422 passes the filtered data to the SM 310 in response to the memory access request.

The texture processing pipeline 400 processes multiple load and store memory access operations directed to various address spaces, including, without limitation, a global address space, a local address space, a generic address space, and a surface address space. As used herein, a generic address space is either a global memory space or a local memory space, where the generic address space is determined to be either a global memory space or a local memory space at runtime. The approaches described herein may be applied to other address spaces and data types, such as vertex data for graphics or command buffer information for controlling rendering or computing operations.

The texture processing pipeline 400 may process various memory access operations directed to these address spaces, where the memory access operations are generated during the execution of various shader program instructions. Such shader program instructions include, without limitation, load operations directed to global memory (LD_G), local memory (LD_L), or generic memory (LD); store operations directed to global memory (ST G), local memory (ST L), or generic memory (ST); cache control operations directed to local memory (CCTL_L), generic memory (CCTL), or texture memory (CCTL_T), global reduction (RED), global atomic (ATOM); and various surface-specific instructions, such as surface load (SU_LD), surface store (SU_ST), surface reduction (SU_RED), surface atomic (SU_ATOM), and surface cache control (SU_CCTL).

Shader programs executing on the SM 310 may issue memory access operations as warp-based request/data streams. The shader program issues instructions at the granularity of a warp, where a warp includes multiple threads. For example, a given warp could include 32 threads. The texture processing pipeline 400 may operate, in whole or in part, on the granularity of a "quad," where a quad is a group of threads corresponding to a two-pixel widextwo-pixel high region of a screen space of the display device 110. This spatial arrangement facilitates level-of-detail calculations, where the texture processing pipeline 400 computes the rate of change of texture coordinates with respect to the screen space. For the purpose of graphics processing, a shader program may pack one or more quads within a warp. Each of the quads themselves may be fully covered, where all four pixels have valid pixel data, or partially covered, where any subset of one, two, or three pixels have valid pixel data. Various policies may be implemented by the texture processing pipeline 400 to control texture processing when a quad is not fully covered. When the size in threads of the request accepted by texture hardware is less than the size of a warp, the shader program sends the command and data information over a series of requests to the texture processing pipeline 400.

Load and store operations directed to local memory, global memory, or generic memory do not involve a level-of-detail calculation. Accordingly, the configuration of threads and the manner in which the shader program issues command and data information from the warp does not necessarily have to match that of a quad. However, the quad processing logic may be efficiently used for global or local memory access operations. In addition, memory access operations may be tracked on a per-warp or per-quad basis, rather than tracking each individual memory access operation, resulting in improved efficiency.

Memory access operations may be processed in the same order in which the memory access operations are received by the texture processing pipeline 400 from the SM 310. Likewise, the results of the memory access operations are returned to the SM 310 in the same order in which the memory access operations are received by the texture processing pipeline 400 from the SM. Accordingly, requests issued by the miss processing unit 412 to the MMU 320, such as during a cache miss or a control request, are transmitted in the same order as received by the texture processing pipeline 400.

In various embodiments, the texture processing pipeline 400 may also support out-of-order processing of memory access operations. In one example, cache misses could kept in original order, and cache hits could likewise be kept in order, but the particular interleaving of cache hits and cache misses with respect to each other could be out of order. In another example, cache misses could be returned to the SM 310 out of order with respect to other misses. In another example, fill data resulting from cache misses could be returned out of order to the texture processing pipeline 400 with respect to the access operations issued by the miss processing unit 412. This fill data could reordered prior to storing the fill data in the data unit 416. The fill data could be reordered externally from the texture processing pipeline 400. Alternatively, the texture processing pipeline 400 could reorder the incoming fill data by waiting for return of all fill data, if any, for the next entry issued by the data FIFO 414 for processing, before transmitting fill data returned for later entries in the data FIFO 414.

Data and status acknowledgements returned by the MMU 320 in response to memory access requests from the miss processing unit 412 may be returned out of order with respect to the order issued by the miss processing unit 412. The texture processing pipeline 400 reorders the returned data and status acknowledgements to ensure data integrity and consistency across the memory access operations.

The texture processing pipeline 400 may resolve resource conflicts resulting from memory access operations by serializing the memory access operations inline rather than requesting that the shader program replay all or part of a memory access operation. Resource conflicts include any number of memory access conflicts, including, without limitation, set conflicts within a cache directory, bank conflicts within data storage memory, and routing conflicts within one or more units of the texture processing pipeline 400.

The texture processing pipeline 400 may identify and distinguish memory access operations directed to different address spaces, such as texture memory, global memory, local memory, and surface memory. Accordingly, each address space may have a different caching policy. The texture processing pipeline 400 may distinguish among various address spaces via a texture identifier. The texture identifier may correspond to a texture header, as further described herein. The set of active texture headers may be stored in a texture header cache. Each texture header may include special state identifiers that indicate which address spaces correspond to the texture header. For example, if 'n' texture headers are currently active and each texture may identify 'k' additional special states, then the number of bits needed to specify a unique texture identifier for every combination of texture header and special state would be given by the expression: ceiling(log 2(n+k)). In one embodiment, texture headers and cached data lines may be shared between textures and surfaces. In another embodiment, texture headers and cached data lines may be tracked separately between textures and surfaces. In yet another embodiment, a texture identifier may be used for which there is associated texture header is associated. In this embodiment, a texture header entry may not be needed to process memory access operations for global or local data. In such cases, a texture identifier may still be used to describe the type of global or local memory access operations, but there is no associated texture header. Such a texture identifier may have a value beyond the range of the range of physical texture header entries.

Address locations for memory access operations directed to textures and surfaces may be expressed as a tuple rather than as a linear address, where a tuple includes a group of elements, such as x, y, and z coordinates, an index, a level-of-detail value, and a texture identifier. By contrast, address locations for memory access operations directed to global memory and local memory may be expressed as a linear address space. In particular, local memory addresses may be defined for a given thread executing in a given warp, or on behalf of a warp, running on a given shader. These local memory addresses may be transformed to translate the thread-relative or warp-relative local memory addresses to the corresponding virtual, or physical, memory addresses in global memory space. This transformation may be performed prior to processing in the texture processing pipeline 400. Alternatively, the texture processing pipeline 400 may perform such memory address transformations. In either case, the texture identifier may be used to identify and distinguish between a coordinate-indexed location and a linearly-indexed location in order to prevent aliasing between address spaces.

At any given time, the data unit 416 in the texture processing pipeline 400 may store texture data, global data, local data, and surface data. The lifetimes of these various data types may vary, based on the application program. Accordingly, the cache memory in the data unit 416 may be efficiently managed by directing cache invalidations to a specific address space. For example, for texture and surface memory, the texture processing pipeline 400 could invalidate all related cache lines regardless of which texture headers point to such related cache lines. In another example, the texture processing pipeline 400 could invalidate only the cache lines associated with a specific texture header. In another example, the texture processing pipeline 400 could invalidate a specific coordinate tuple. In yet another example, the texture processing pipeline 400 could invalidate all local memory cache lines, all global memory cache lines, both local and global memory cache lines, or a specific local or global memory address.

In addition, cache policies may vary independently by address space. A cache policy may also allow uncached data to be temporarily cached for the lifetime of a warp request. For example, the shader program could issue a sequence of requests to the texture processing pipeline 400 on behalf of a warp. That sequence of requests could share a common operation, e.g., load, store, reduction, atom, invalidate, and cache operation, e.g., cache at L1 level, cache only at L2 level, cache streaming, cache volatile. If a request is directed to an uncached location, the texture processing pipeline 400 could nevertheless temporarily "cache" or coalesce the data only for the lifetime of the warp request. After the last thread of the warp has been serviced within the request, all data lines holding the uncached data would be invalidated. These lines could be identified by an "uncached" texture identifier or by an extra "uncached" bit added to cache tag directory.

The MMU 320 translates virtual addresses generated by the texture processing pipeline 400 into physical memory addresses. Memory load or read operations generated by a given warp or by different warps and processed by the texture processing pipeline 400 may fall within a single physical page, as referenced by the MMU 320. The texture processing pipeline 400 may detect such an occurrence and transmit incremental memory access request information for the second memory access operation rather than an additional complete memory access request, where a complete memory access request includes a translation request and an incremental memory access request does not include a translation request. The texture processing pipeline 400 may combine the complete memory access request associated with the first memory access operation and the incremental memory access request associated with the second memory access operation. The texture processing pipeline 400 may transmit the combined memory access request to the MMU 320. Such an approach allows the MMU 320 to perform multiple translations in the context of a single translation request.

The store path in the texture processing pipeline 400 supports store or write operations at an arbitrary byte-level granularity. As such, storing an operand as a vector of 1, 2, 4, 8, or 16 bytes may be concatenated with command, address, or additional operand information, based on the memory bandwidth of the store path. Such concatenated writes may reduce the number of memory store operations. Reduction and atomic operations may be similarly concatenated.

Concatenation refers to combining the command and address portion, or simply the command portion, of a memory access request with a portion of the data packet, that is, a data sub-packet, sent to memory. Concatenation may arise from a bus structure connecting the texture processing pipeline 400 to the memory subsystem, where the bus structure is not wide enough to transfer both the command, address, and store data sub-packet simultaneously. In one embodiment, the command is transmitted first with an indication of the quantity and type of data sub-packets that follow the command. The data sub-packets are then transmitted. The data sub-packets may be accompanied by per-byte write enables, where the store data and associated write enables are sent simultaneously. When all of the store data sub-packets are transmitted, the store operation is said to be "fully covered." A "fully covered store operation" may indicated by transmitting a separate command field identifying the associated memory access operation as fully covered.

As a result, "all-enabled" per-byte write enables need not be transmitted with the transmitted data. The signals normally used for transmitting the per-byte write enables are then available for storing a portion of the command information, while still allowing the bus interface to be narrower than when transmitting the command and data together. Such an optimization "concatenates" the command and data information. This optimization may be further refined by only identifying a memory access operation as fully covered when only the first data sub-packet being written is fully covered, rather than when all data sub-packets are fully covered. By coalescing memory access operations prior to concatenation, the probability of sending a concatenated request to the memory subsystem may be increased to the extent that coalescing is able to accumulate fully covered store data sub-packets. However, coalescing is not a precondition to forming a concatenated request. As such, the concatenation process may be independent from the coalescing process.

In addition to processing received memory access operations, the texture processing pipeline 400 may speculatively prefetch data, either directly by shader instructions issued by a shader program or by control logic within the texture processing pipeline 400.

Memory faults and other status encountered by the MMU 320 may be reported for memory access operations by the texture processing pipeline 400. For example, the texture processing pipeline 400 could report an ACK status indicating that the MMU 320 successfully performed a virtual to physical address translation. In another example, the texture processing pipeline 400 could report a NACK status indicating that the MMU 320 was unable to perform a virtual to physical address translation. Such a condition may be considered a fatal event, such that the memory access operation may not complete. In another example, the texture processing pipeline 400 could report a TRAP status indicating that the MMU 320 was unable to perform a virtual to physical translation. In the case of a TRAP condition, the texture processing pipeline 400 would not treat the condition as a fatal event. Rather, the texture processing pipeline 400 would effectively discard the associated write or reduction operations, return constant data, such as zero, for associated read or atomic operations, and invoke a special trap hander to report more details about the faulting event. If the texture processing pipeline 400 receives translation status feedback from the MMU 320 out of order with respect to the corresponding memory access operations, and the texture processing pipeline 400 would reorder all or part of the translation status feedback to match the original order of memory access operations as needed.

In another example, the texture processing pipeline 400 could report a SPARSE status. In the case of a SPARSE condition, a zero value would be returned, as with the TRAP condition, and writes would be discarded. With a SPARSE condition, however, a trap handler is not automatically invoked. Rather, the SPARSE status is returned with the data to the SM 310, and control of the resulting action taken is given to the shader program executing on the SM 310.

Memory access operations received by the texture processing pipeline 400 may be directed only to global address space or to local address space. In addition, the texture processing pipeline 400 may receive memory access operations directed to a generic address space, where the generic address is determined to be either a global memory access or a local memory access at run-time on a per-thread basis. The texture processing pipeline 400 may accept memory access operations directed to the various address spaces and divides the memory access operations into local-only and global-only phases as needed.

Alternatively, memory access operations received by the texture processing pipeline 400, loads in particular, may be for scalar data (generally s 32 bits) or vector data (generally 64 or 128 bits) on behalf of each thread in a warp. The texture processing pipeline 400 uses the base address of the vector for tag generation, tag lookup, miss processing, and latency storage between the tag lookup and data storage. Once all the data is available for the request, the data 416 uses the base address and operand size to retrieve the vector requested by each thread. Such an approach allows more threads to be simultaneously processed while performing tag lookup and miss processing operations, leading to reduced processing time.

When surface memory access operations are processed, the texture processing pipeline 400 may take advantage of similarities between surface and texture operations, such as the use of texture headers to describe various properties, accessing memory via a coordinate tuple rather than a linear address, and accessing memory via multiple views, such as a 10 element, a 10 array, a 20 element, a 20 array, or a 3D element. Both surface and texture operations allow the texture header information to be bound as constant index for all requesting threads in a warp. Alternatively, the texture header information may be bind less, in that each thread may specify a unique texture header. Logic either prior to or with the texture processing pipeline 400 may identify the unique texture headers selected among the threads and serialize the corresponding memory access operations as needed. Notably, the texture processing pipeline 400 may process surface memory access operations differently than texture memory access operations, as further described below.

The maximum number of dimensions supported by surface operations may be different from the maximum number of dimensions supported by texture operations. Texture memory access operations may need additional information beyond the data in a texture header regarding how the texture should be sampled. Such information may be stored in a separate sampler header. In one embodiment, surface operations processed by the texture processing pipeline 400 do not need this additional sampler header.

Texture memory access operations are typically directed to a spatially coherent region of memory and typically involve a level-of-detail calculation with isotropic/anisotropic sampling and filtering operation. Surface memory access operations are not necessarily spatially coherent, and, as a result, do not typically use such level-of-detail calculations and filtering operation. Accordingly, certain stages of the texture processing pipeline 400 may be bypassed during surface memory access operations, as further described herein. Stages the texture processing pipeline 400 may be bypassed via a bypass circuit within each of the stages. Alternatively, external bypass circuits may bypass one or more stages external to the stages.

Stages that may be bypassed include, without limitation, the level of detail (LOD) unit 406, the sampling control and address unit 408, the data unit 416 (for any texture specific block decompression and formatting), and the filter and return unit 422 (for any texture-specific filtering). In one example, the LOD unit 406, the sampling control and address unit 408, and the filter and return unit 422 could independently determine whether a particular memory access request bypasses the respective stages. General load/store memory access requests would bypass all three of these stages. Surface load/store memory access requests would bypass only the LOD unit 406 and the filter and return unit 422.

Via data fields within the sampler header, textures memory access operations generally support a wide range of clamping, wrapping, and border color substitution behaviors for memory access operations that straddle between two texture allocations or that access beyond the dimensions of a texture allocation. The texture processing pipeline 400 may support all, none or a subset of these behaviors for surface memory access operations.

Surface coordinates associated with surface memory access operations may be supplied using various approaches. Surface coordinates may be supplied as integer values, where the coordinates are flexibly scaled using one of three approaches.

For example, the texture processing pipeline 400 could use pixel addressing, where the specified x-coordinate would represent a unit of a full pixel and is scaled to a byte address using the format information from the texture header. This approach would allow run-time generation of the address from the texture header used by a given instruction in a shader program. Additionally, this approach allows format conversions between the pixel as stored in the allocation and the data received and returned to the SM 310.

In another example, the texture processing pipeline 400 could use raw addressing, where the x coordinate would represent a unit in terms of the operand size supplied with the request rather than from the texture header. In the approach, the dimensions and format from the texture header would still control surface clamping.

In yet another example, the texture processing pipeline 400 could use byte addressing, where the x coordinate would represent a raw byte address and that is aligned to the operand size supplied with the request. The dimensions and format from the texture header would still control surface clamping though.

Surface memory access operations may specify a surface clamping policy that indicates how to respond if the coordinates and index supplied with the surface memory access operations are outside the bounds defined by the texture header. For example, one surface clamping policy could direct the texture processing pipeline 400 to return zero for out-of-bounds load or read operations and ignore, or cull, out of bound store or write operations, such that no store or write operation is transmitted to the MMU 320. A second surface clamping policy could direct the texture processing pipeline 400 to modify the out-of-bounds surface coordinates to the nearest in-bounds value and continue the operation as normal. A third surface clamping policy could direct the texture processing pipeline 400 to report any out-of-bounds coordinates to the SM 310. The SM 310 could then invoke a trap handler to further investigate and report this condition.

The surface atomic instructions, SU_REO and SU_ATOM, may specify one of two surface-defined operand size modifiers .S032 and .S064. These modifiers allow the texture processing pipeline 400 to determine the operand format information, e.g., signed or unsigned, at run time using information from the texture header rather than at compile time. The texture processing pipeline 400 substitutes the proper operand formation information before transmitting requests to the MMU 320.

Figure 5:
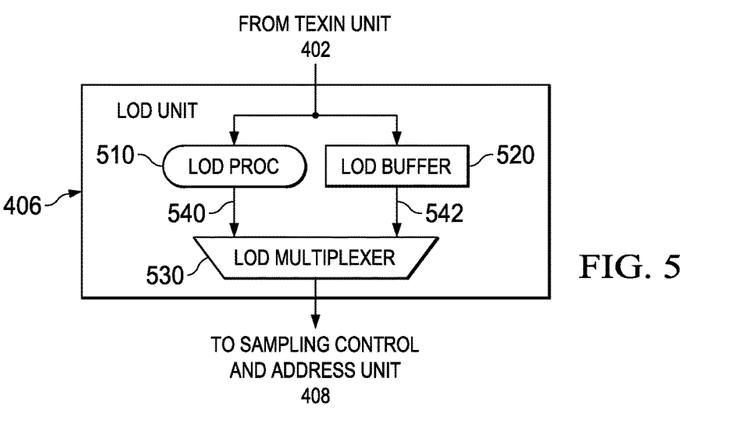
FIG. 5 illustrates the LOD unit of the texture processing pipeline of FIG. 4, according to one embodiment of the present invention.

FIG. 5 illustrates the LOO unit 406 of the texture processing pipeline 400 of FIG. 4, according to one embodiment of the present invention. As shown, the LOO unit 406 includes an LOO processor (LOO proc) 510, an LOO buffer 520, and an LOO multiplexer 530.

The LOD processor 510 receives memory access requests from the TEXIN unit and performs the function of the LOD unit 406 for the memory access requests, as described herein in conjunction with FIG. 4. The LOD buffer 520 temporarily stores the incoming memory access operations, without performing the functions of the LOD processor 510.

The LOD multiplexer 530 selects the output of the LOD processor 510 or the LOD buffer 520 depending on whether the incoming memory access request needs the functionality of the LOD unit 406 for completion. For example, a texture operation could use the LOD unit 406 to access a level of detail within the texture cache. Accordingly, the LOD multiplexer 530 would be configured to select input 540 to route the output of the LOD processor 510 to the sampling control and address unit 408. In another example, a load operation could be completed without using the functions of the LOD unit 406. The LOD multiplexer 530 would be configured to select input 542 to route the output of the LOD buffer 520 to the sampling control and address unit 408. In various embodiments, such a bypass mechanism may be deployed in anyone or more of the units shown in FIG. 4, including, without limitation, the sampling control and address unit 408 and the filter and return unit 422.

Figure 6:
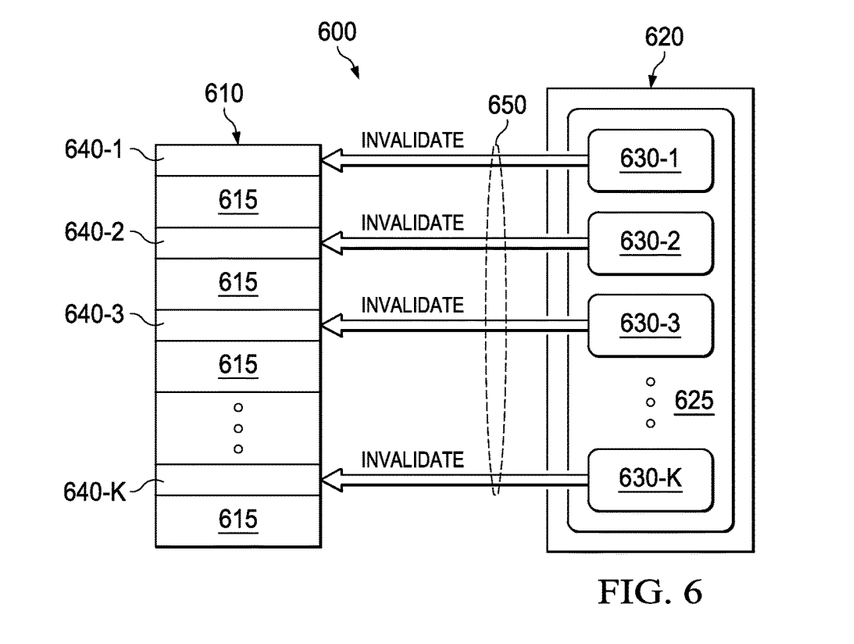
FIG. 6 is a block diagram of a parallel processor having an execution unit, a control unit and a cache.

FIG. 6 is a block diagram illustrating a parallel processor 600 configured to reduce the impact of invalidation. As shown, the parallel processor 600 includes, without limitation, a cache 610 and a parallel execution unit 620. In one embodiment, the parallel processor 600 is a GPU. In other embodiment, the parallel processor 600 is a GPU in a parallel processing subsystem such as the parallel processing subsystem 112 in FIG. 1.

The cache 610 is a conventional cache configured to receive a portion of data pertaining to an operation from the next level cache (not shown). In the embodiment shown in FIG. 6, the cache 610 is a texture cache and the portion of the data is a line of data 615 pertaining to a surface operation 625. In one embodiment, the operation 625 is a programmable blending operation and the line of data 615 is multiple samples within a pixel to be used in the operation 625.

The parallel execution unit 620 is configured to execute parallel counterparts 630 of the operation 625. In the embodiment shown in FIG. 6, the operation 625 has K parallel counterparts 630. In one embodiment, the parallel counterparts 630 are parallel processing warps or threads of the operations 625 being executed in the parallel execution unit 620.

When executed, the parallel counterparts 630 are configured to create multiple aliases 640 for the line of data 615. As its name suggests, all aliases 640-1, 640-2, 640-3, and 640-K technically refer to a same line of data while they appear different, at least to the parallel counterparts 630. In the embodiment shown in FIG. 6, the aliases 640 refer to the line of data 615, and the number of the aliases 640 matches the number of parallel counterparts 640 of the operation 625. The number of aliases 640, i.e., K, may be any positive integer.

Once created, the aliases 640 of the line of data 615 are assigned to the parallel counterparts 630 of the operation 625. In the embodiment shown in FIG. 6, each of the parallel counterparts 630 correspond to each different alias. In one embodiment where the number of parallel counterparts 630 is greater than the number of the aliases 640, the aliases 640 of the line 615 may be assigned based on a number of parallel counterparts 630 using the aliases 640. In such an embodiment, a counter may be employed to "load-balance" the usage of the aliases 640 by atomically incrementing the counter when a parallel counterpart 630 uses an alias 640 and atomically decrementing the counter when the parallel counterpart 630 invalidates.

As the parallel counterparts 630 are further executed, the parallel counterparts 630 start to load the line of data 615 into the cache 610 using the assigned aliases 640. As the parallel counterparts 630 are executed in parallel in the parallel execution unit 620, loadings by the parallel counterparts 630 are executed in parallel. In one embodiment, loading operations are carried out by the parallel counterparts 630 executing texture a load operation.

As shown in FIG. 6, the cache 610 becomes loaded with K aliases that contain K copies of the line of data 615. It is noted that the number of the aliases 640 of the line of data 615 may be limited to the physical limitation of the corresponding memory structure such as the number of entries in the cache 610. In the embodiment where the cache 610 is virtually indexed, the aliases of the line of data 615 represent a multiple ranges of virtual addresses in the cache 610.

As the parallel counterparts 630 are further executed, a respective function of the operation 625 is performed. For an afore-mentioned programmable blending operation, blend functions are performed by the parallel counterparts 630. In one embodiment, blend functions include blending color values to accomplish transparency. Once the functions are performed, the parallel counterparts 630 store the respective outputs of the operation 625 to the cache 610 using their respective aliases 640. In one embodiment, a store operation is carried out by the parallel counterparts 630 executing a surface store operation.

As mentioned above, a surface store operation is not coherent with a texture load operation and the parallel counterparts 630 are required to invalidate after the surface store operation. As shown by multiple arrows 650 in FIG. 6, each of the parallel counterparts 630 is operable to invalidate only the corresponding alias 640. As an invalidation is carried out by each parallel counterpart 630 using its own alias 640, invalidation of one parallel counterpart 630 does not affect others.

In one embodiment, the operation 625 is a surface operation in a library of graphics operations. The operation 625 is an "interlock" that prevents multiple parallel counterparts 630 from working on the same portion or datum in the line of data 615. As such, there is no need to worry that the cache 610 is incoherent as long as the cache 610 is in a "clean" state when the operation 625 is complete.

It is noted that while the parallel counterparts 630 are executed simultaneously, the progress of each parallel counterpart 630 may differ from one another. For example, while one parallel counterpart may be performing a function of an operation, other counterpart may be finished with performing the function and is in the process of invalidating.

It is further noted that various hardware such as the cache 610 and the parallel execution unit 620 discussed herein are not physically modified to perform the above described process. The various hardware are conventional, off-the shelf hardware.

Figure 7:
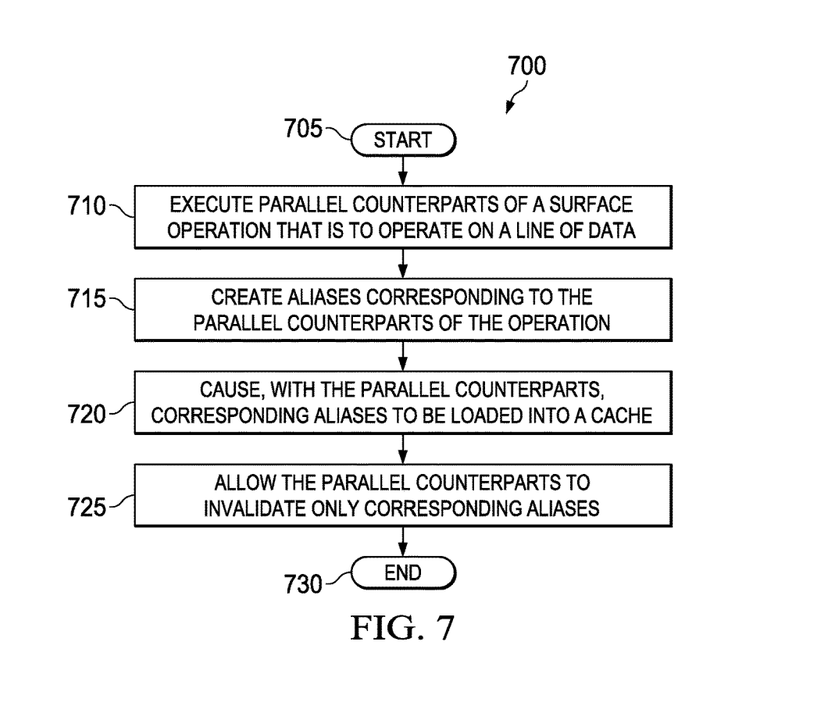
FIG. 7 is a flow diagram of one embodiment of a method of reducing the impact of cache invalidation.

FIG. 7 is a method 700 of reducing the impact of cache invalidation. The method starts at a start step 705. At step 710, parallel counterparts, e.g., the parallel counterparts 630 in FIG. 6, of a surface operation are executed. The surface operation, e.g., the operation 625 in FIG. 6, operates on a line of data. In one embodiment, the parallel counterparts are executed in a parallel execution unit such as 620 in FIG. 6. At step 715, aliases of the line of data, e.g., the aliases 640 in FIG. 6, are created and assigned to the parallel counterparts. In one embodiment, the aliases are assigned and correspond to the parallel counterparts based on a number of parallel counterparts already assigned to the aliases.

At step 720, the parallel counterparts cause the corresponding aliases to be loaded into a cache such as the texture cache 610 in FIG. 6. Each of the aliases corresponds to and includes a respective copy of the line of data. In one embodiment, the aliases are loaded by executing a texture load. Once loaded, respective function of the operation is performed and the outputs are stored with respective aliases. In one embodiment, the aliases are stored by the parallel counterparts executing a surface store operation.

As mentioned above, a surface store operation is not coherent with a texture load operation and the parallel counterparts are required to invalidate after the surface store operation. As shown by multiple arrows 650 in FIG. 6, each of the parallel counterparts is operable to invalidate only the corresponding alias. As such, at step 725, the parallel counterparts are allowed to invalidate only corresponding aliases. The method 700 ends at step 730.

The above-described methods may be embodied in or performed by various conventional digital data processors, microprocessors or computing devices, wherein these devices are programmed or store executable programs of sequences of software instructions to perform one or more of the steps of the methods, e.g., steps of the method 700 in FIG. 7. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 7. Additionally, an apparatus may be designed to include the necessary circuitry or programming to perform each step of a method disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

FIGS. 6 and 7 are further explained with referenced to the sample program shown in Tables 1 and 2, below. The sample program in Table 1 is a program using the conventional invalidation scheme and the sample program in Table 2 is a revised version of the program in table 1 using the improved invalidation scheme as discussed above. The sample programs involve the GM20X Programmable Blending POR, which has a fragment shader suffix such as:

TABLE 1

Example Original Shader

H = texture header for current rendertarget;
(x,y) = current pixel location;
Loop over several samples in a pixel {
   (i) = current sample index;
   Texture Load (H,x,y,i);
   Run blend function;
   Surface Store (H,x,y,i);
}
Invalidate (H)

In the program shown in Table 1, a single header H represents a line of data to be used by multiple parallel counterparts during an operation. Because H represents the entire line of data, every time one of the multiple parallel counterparts issues an invalidation, the invalidation invalidates the entire line of cached data cache and prevents other parallel counterparts from reusing data.

TABLE 2

Example Revised Shader

```
W = SR_WarpID % N;
H = header[W];
(x,y) = current pixel location;
Loop over several samples in a pixel {
    (i) = current sample index;
    Texture Load (H,x,y,i);
    Run blend function;
    Surface Store (H,x,y,i);
}
Invalidate (H)
```

The program shown in Table 2 is a version of the program in Table 1 revised according to the improved header scheme discussed above. In the revised shader suffix, the header H now represents one of multiple aliases of the line of data that correspond to multiple parallel counterparts. As such, when one of the parallel counterparts issues an invalidation, it only invalidates an alias of the cached line that corresponds to the issuing counterpart and allows other counterparts to reuse the cached data.

As mentioned above, hardware on which the above described shader suffix is executed are conventional, off the shelf hardware that is not physically modified or customized in any way. Those skilled in the art to which this application relates will appreciate that other and further additions, deletions, substitutions and modifications may be made to the described embodiments.

The invention claimed is:

1. A parallel processor, comprising:
a cache configured to receive data pertaining to an operation; and
a parallel execution unit associated with said cache and configured to execute parallel counterparts of said operation such that, when executed in parallel, said parallel counterparts is configured to create in said cache multiple aliases for said data, each of said multiple aliases corresponding to a different copy of said data,
wherein each of said parallel counterparts is operable to invalidate only one of said different copies of said data.

2. The parallel processor as recited in claim 1 wherein said multiple aliases are created in said cache by executing a texture load.

3. The parallel processor as recited in claim 1 wherein said parallel processor is a graphics processing unit.

4. The parallel processor as recited in claim 1 wherein said operation includes blending color values to accomplish transparency.

5. The parallel processor as recited in claim 1 wherein said parallel counterparts are configured to store said multiple aliases by executing a surface store.

6. The parallel processor as recited in claim 1 wherein said operation prevents said parallel counterparts from working on a same portion of said data.

7. The parallel processor as recited in claim 1 wherein said multiple aliases correspond to said parallel counterparts based on a number of said parallel counterparts using said multiple aliases.

8. A method of reducing an impact of cache invalidation, comprising:
executing, using a parallel processor, parallel counterparts of a surface operation in parallel, said operation pertaining to data in a cache;
causing, with said parallel counterparts, multiple aliases for said data to be loaded into said cache, each of said multiple aliases corresponding to a different copy of said data; and
allowing each of said parallel counterparts of said operation to invalidate only one of said different copies of said data.

9. The method as recited in claim 8 wherein said cache is associated with a parallel processor and said multiple aliases are loaded by executing a texture load.

10. The method as recited in claim 8 wherein said parallel processor is a graphics processing unit.

11. The method as recited in claim 8 wherein said cache is a texture cache.

12. The method as recited in claim 11 wherein said multiple aliases are stored by executing a surface store.

13. The method as recited in claim 8 wherein said operation prevents said parallel counterparts from working on a same portion of said data.

14. The method as recited in claim 8 wherein said multiple aliases correspond to said parallel counterparts based on a number of said parallel counterparts using said multiple aliases.

15. A non-transitory computer readable medium storing a surface operation that is executable by a processor, said surface operation comprising:
executing parallel counterparts of said surface operation in parallel, said operation pertaining to data in a cache;
causing, with said parallel counterparts, multiple aliases for said data to be loaded into said cache, each of said multiple aliases corresponding to a different copy of said data; and
allowing each of said parallel counterparts of said operation to invalidate only one of said different copies of said data.

16. The non-transitory computer readable medium as recited in claim 15 wherein said multiple aliases are loaded by executing a texture load.

17. The non-transitory computer readable medium as recited in claim 15 wherein said cache is a texture cache.

18. The non-transitory computer readable medium as recited in claim 15 wherein said multiple aliases are stored by executing a surface store.

19. The non-transitory computer readable medium as recited in claim 15 wherein said operation prevents said parallel counterparts from working on a same portion of said data.

20. The non-transitory computer readable medium as recited in claim 15 wherein said multiple aliases correspond to said parallel counterparts based on a number of said parallel counterparts using said multiple aliases.

* * * * *

UNITED STATES PATENT AND TRADEMARK OFFICE
CERTIFICATE OF CORRECTION

PATENT NO. : 10,121,220 B2  
APPLICATION NO. : 14/698024  
DATED : November 6, 2018  
INVENTOR(S) : Jeffrey Bolz Page 1 of 1

It is certified that error appears in the above-identified patent and that said Letters Patent is hereby corrected as shown below:

In the Specification

In Column 3, Lines 14-16, delete "Memory bridge 105 is further coupled to an 110 (input/output) bridge 107 via a communication path 106, and 110 bridge 107 is, in turn, coupled to a switch 116." and insert --Memory bridge 105 is further coupled to an I/O (input/output) bridge 107 via a communication path 106, and I/O bridge 107 is, in turn, coupled to a switch 116.--

In Column 3, Line 17, after --In operation,-- delete "110" and insert --I/O--

In Column 3, Line 22, after --between-- delete "110" and insert --I/O--

In Column 5, Line 3, after --includes an-- delete "IID" and insert --I/O--

In Column 5, Line 6, after --105.-- delete "IID" and insert --I/O--

In Column 6, Line 22, after --with-- delete "110" and insert --I/O--

Signed and Sealed this  
First Day of January, 2019

Andrei Iancu  
*Director of the United States Patent and Trademark Office*